US007361837B2

(12) United States Patent
Wells

(10) Patent No.: US 7,361,837 B2

(45) Date of Patent: Apr. 22, 2008

(54) ELECTRICAL CONNECTION DEVICE

(76) Inventor: Mark Wells, 1 Cooper Street, Dudley, NSW 2290 (AU)

(*) Notice: Subject to any disclaimer, the term of this patent is extended or adjusted under 35 U.S.C. 154(b) by 0 days.

(21) Appl. No.: 10/551,371

(22) PCT Filed: Mar. 29, 2004

(86) PCT No.: PCT/AU2004/000398

§ 371 (c)(1),
(2), (4) Date: Jul. 31, 2006

(87) PCT Pub. No.: WO2004/086568

PCT Pub. Date: Oct. 7, 2004

(65) Prior Publication Data

US 2007/0037443 A1 Feb. 15, 2007

(30) Foreign Application Priority Data

Mar. 28, 2003 (AU) .............................. 2003901623

(51) Int. Cl.
*H02G 15/02* (2006.01)

(52) U.S. Cl. ...................................... 174/74 R; 174/78

(58) Field of Classification Search .............. 174/74 R, 174/75 C, 76, 78, 82, 83, 84 R, 84 S, 86, 174/88 C See application file for complete search history.

(56) References Cited

U.S. PATENT DOCUMENTS

| | | | | |
|---|---|---|---|---|
| 1,947,481 | A * | 2/1934 | Meyer | 174/22 R |
| 2,860,226 | A * | 11/1958 | Williams et al. | 219/437 |
| 3,156,512 | A | 11/1964 | Peterson et al. | |
| 3,249,907 | A * | 5/1966 | Hewitson | 439/461 |
| 4,152,038 | A | 5/1979 | Inouye et al. | |
| 4,820,204 | A | 4/1989 | Batty | |

(Continued)

FOREIGN PATENT DOCUMENTS

AU A-40728/85 10/1985

(Continued)

OTHER PUBLICATIONS

Australian International-Type Search Report, No. 2003901623, dated Apr. 16, 2003.

(Continued)

*Primary Examiner*—William H. Mayo, III

(74) *Attorney, Agent, or Firm*—Portland Intellectual Property, LLC

(57) ABSTRACT

An electrical connection device (10) for connecting a multi-core machine cable to another electrical device comprises a body (12) having an end-face with apertures and a plurality of insulating sleeves (22) extending about the apertures and a plurality of core coupling means (26, 28) each being at least in part positioned in a respective sleeve. Each core coupling means is connectable to a respective core (29) of the machine cable and has a first contact surface (14) for connecting to a terminal of another electrical device. The device comprises a plurality of spaced apart earth coupling means (24) which surround at least a portion of respective insulating sleeves. Each earth coupling means is connectable to a respective earth potential layer (31) of the machine cable and has a second contact surface (32) for connecting to an earth-potential terminal of another electrical device so that within the electrical connection device the core coupling means are earth-potential screened from one another.

25 Claims, 3 Drawing Sheets

U.S. PATENT DOCUMENTS

| | | | | | |
|---|---|---|---|---|---|
| 4,874,328 | A | | 10/1989 | LeDall et al. | |
| 4,934,963 | A | | 6/1990 | Gardner et al. | |
| 5,271,286 | A | | 12/1993 | Vranish | |
| 5,280,254 | A | * | 1/1994 | Hunter et al. | 333/124 |
| 5,580,282 | A | * | 12/1996 | Paterek | 439/685 |
| 6,039,604 | A | * | 3/2000 | Tindall | 439/598 |
| 6,042,424 | A | * | 3/2000 | LaCoy et al. | 439/608 |
| 6,045,389 | A | * | 4/2000 | Ferrill et al. | 439/398 |
| 6,077,122 | A | * | 6/2000 | Elkhatib et al. | 439/608 |
| 6,129,586 | A | * | 10/2000 | Bellemon | 439/607 |

FOREIGN PATENT DOCUMENTS

| | | | |
|---|---|---|---|
| AU | 200035321 | A1 | 5/2000 |
| AU | 200193330 | B2 | 11/2001 |
| DE | 2502204 | A1 | 7/1976 |
| EP | 0 151 710 | | 8/1985 |
| FR | 2658005 | | 8/1991 |
| GB | 1466643 | | 3/1977 |
| GB | 2239991 | A | 7/1991 |
| WO | WO 99/08343 | | 4/1998 |

OTHER PUBLICATIONS

International Publication No. WO 98/15037, dated Apr. 9, 1998, Metal Manufactures Limited, Appl. No. PCT/AU97/00651 filed Sep. 30, 1997.

International Search Report No. PCT/AU2004/000398, dated May 6, 2004, with Written Opinion dated May 11, 2004.

Australian Patent Appl. No. AU 2001 87239, filed Nov. 1, 2001, as published May 9, 2002, Consolidated Manufacturing Industries Ltd.

Australian Search Report No. 2003901612, dated Apr. 17, 2003.

International Search Report No. PCT No. AU2004/000443, dated Jun. 10, 2004, with Written Opinion dated Jun. 17, 2004.

* cited by examiner

ELECTRICAL CONNECTION DEVICE

FIELD OF THE INVENTION

The present invention broadly relates to an electrical connection device for a machine cable. Throughout this specification the term "machine cable" is used for any machine, reeling or trailing cable that is suitable to deliver power to mobile machinery such as machinery in petroleum or mining industry. Further, throughout this specification the term "electrical device" has a meaning that includes an electrical connection device for a machine cable.

BACKGROUND OF THE INVENTION

Machine cables are typically used to provide an electrical connection for mobile electrical machines. For example, in the mining or petroleum industry often large electrical machinery is used and each machine cable may have to provide power in the order of a few hundred kilowatts to a few megawatts. Typically such power is delivered with a voltage of one or more kilovolts. The cables usually comprise a plurality of cores and are connected using electrical connection devices including sockets, pins and thimbles.

The cores typically are insulated from each other and surrounded by a conductive layer that is on earth potential. Therefore, if the cores break, individual broken cores are less likely to be in electrical contact with each other, but instead are likely to be in electrical contact with respective layers that are on earth potential. Often automatic electrical earth leakage protection devices are used and in case of electrical contact between one of the cores and one or more layers that are on earth potential, an automatic electrical earth leakage protection device will detect an earth leakage current in the order of 30 mA and subsequently interrupt the supply of electricity. Therefore, melt-down of the cable, electrical arcing and the like can largely be avoided. However, within a plug/coupling connection (electrical device) individual cores typically are not surrounded by individual layers on earth potential but are stripped off the layer and are surrounded by a common electrical casing that is on earth potential. Therefore, if individual cores are disrupted within the plug, it is more likely that the disrupted cores are in direct electrical contact with each other with fault current capacities of 10 kA to 50 kA. This will have dangerous consequences especially in an environment that may contain explosive gases such as a mine.

SUMMARY OF THE INVENTION

The present invention provides in a first aspect an electrical connection device for connecting a multi-core machine cable to a suitable other electrical device, the multi-core machine cable being of the type having insulated cores individually surrounded by earth-potential layers, the device comprising:

a body having an end-face, the end-face having apertures, a plurality of insulating sleeves extending about respective apertures, a plurality of core coupling means each being at least in part positioned in a respective sleeve, each core coupling means being connectable to a respective core of the machine cable and having a first contact surface for connecting to a terminal of the suitable other electrical device so as to provide electrical connections of the machine cable with the suitable other electrical device, a plurality of spaced apart earth coupling means surrounding at least a portion of respective insulating sleeves, each earth coupling means being connectable to a respective earth-potential layer of the machine cable and having a second contact surface for connecting to an earth potential terminal of the suitable other electrical device so that within the electrical connection device the core coupling means are earth-potential screened from one another.

Each core coupling means typically is, in use, surrounded by a respective insulating sleeve and by a respective conductive layer.

Each insulating sleeve typically is surrounded along its length by a respective earth-potential coupling means which typically comprises a conductive layer. In this case, within the body of the electrical connection device, each core and the respective connection device typically is surrounded by an individual conductive layer that has, in use, earth potential. If cores break within the body, dangerous short circuits are less likely to occur as the cores of the broken branches are likely to contact the conductive layers that have earth potential rather than each other. An automatic electrical protection system, such as an earth leakage system, can then be utilised to interrupt the supply of electricity and the danger of melting of cable insulation, electrical arcing which in an environment that may contain explosive gases such as a mine may result in an explosion, therefore is reduced.

The electrical connection device typically is suitable for delivery of a power of more than 100 kW or even more than 1 MW.

The core coupling means may comprise a socket. Alternatively, the core coupling means may comprise a pin.

Each individual earth coupling means may have a ring-like contact which comprises the second contact surface and which may be positioned at or within the apertures.

The insulating sleeves typically are provided in form of tubes that may have threads at one end. The ring-like contacts typically are provided in form of nuts that are receivable by the threads of the insulating tubes.

The end-face may be electrically insulating. In this case a continuation of individual earth-connections to a suitable other device is possible by connecting each nut to a respective earth potential layer of the other electrical device. For example, the core coupling means of the electrical connection device may comprise pins and the first portion of the other electrical device may comprise sockets. The suitable other device may comprise ring-like contacts that are electrically connected to respective earth potential layers of the other device. In this case continuous earth connections can be established by face-to-face connection of respective ring-like contacts. This arrangement has the particular advantage that technical testing procedures of the multi-core machine cable connected to the electrical connection device can be performed without the need to dismantle the electrical connection device.

Alternatively, the end-face of the body may be conductive. In this case the ring-like contacts typically are electrically connected to the end-face. A continuous earth-connection to a suitable other electrical device is possible by face-to-face connection to the suitable other electrical device. If the ring-like contacts are provided in form of nuts, technical testing procedures of the multi-core machine cable connected to the electrical connection device only require unscrewing the nuts such that the earth potential layers are electrically separated.

For example, the nuts may have an electrical conductive surface on their thread which may be arranged to contact a respective conductive layer. Each nut may also be composed of an electrically conductive material.

In one form, each insulating sleeve is arranged so that, in addition to the pin or socket that is positioned within the sleeve and when the electrical connection device is connected to the suitable other electrical device, a socket or pin, respectively, of the suitable other device is positioned within the insulating sleeve.

In one embodiment of the invention the multi-core machine cable is a three-core machine cable such as a three-phase cable. In this case the electrical connection device typically comprises three apertures and three insulating tubes associated with the apertures.

The body may comprise a metallic exterior surface. However, if in use earth potential layers of the individual cores of the multi-branch machine cable are connected to individual ones of the earth-potential coupling means, there may be no need for a metallic body for earthing purposes. Thus, the body may alternatively comprise an exterior surface portion that is electrically insulating and typically is itself electrically insulating. For example, the body may be composed of polymeric material.

Optionally, each insulating sleeve may be surrounded by a plurality of conductive layer which are electrically isolated so that, in use, a plurality of separate earth potential screens may be established.

The present invention provides in a second aspect an electrical connection device for connection to a suitable other electrical device the device comprising:

a multi-core machine cable of the type having insulated cores individually surrounded by earth-potential layers, a body having an end-face, the end-face having apertures, a plurality of insulating sleeves extending about respective apertures, a plurality of core coupling means each being at least in part positioned in a respective sleeve, each core coupling means being connected to a respective core of the machine cable and having a first contact surface for connecting to a terminal of the suitable other electrical device so as to provide electrical connections of the machine cable with the suitable other electrical device, a plurality of spaced apart earth coupling means surrounding at least a portion of respective insulating sleeves, each earth coupling means being connected to a respective earth-potential layer of the machine cable and having a second contact surface for connecting to an earth potential terminal of the suitable other electrical device so that within the electrical connection device the core coupling means are earth-potential screened from one another.

The present invention provides in a third aspect a system comprising:

at least one of the above-defined electrical connection devices, at least one multi-core machine cable being of the type having insulated cores individually surrounded by earth-potential layers and at least one electrical machine, wherein the system is arranged so that electricity is delivered through the or each machine cable and through the or each electrical connection device and wherein the electricity associated with each core is individually earth-potential screened in the multi-core cable and in the or each electrical connection device.

Specific embodiments of the invention will now be described, by way of example only, with reference to the accompanying drawings.

DETAILED DESCRIPTION OF SPECIFIC EMBODIMENTS OF THE INVENTION

Figure 1:
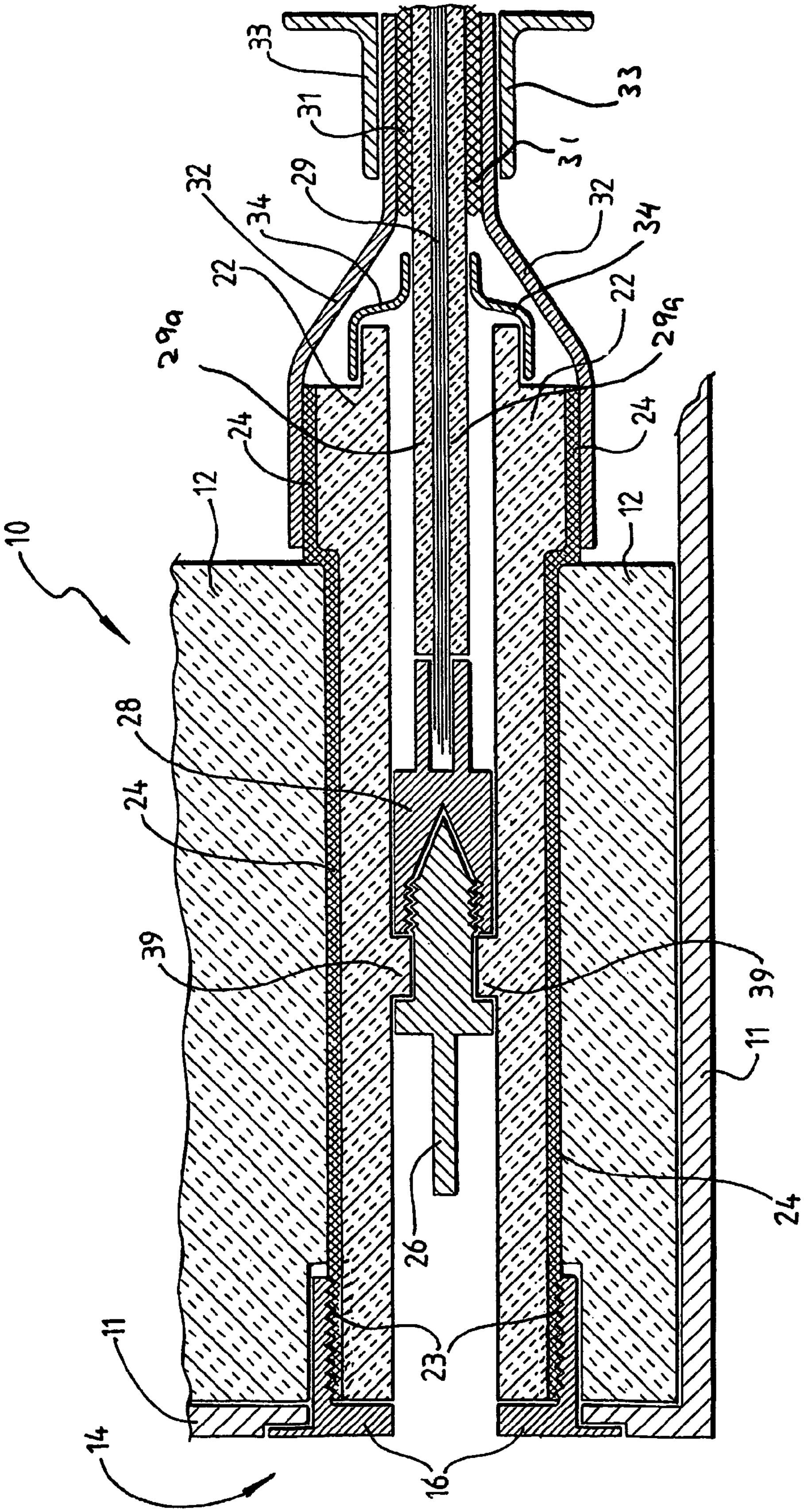
FIG. 1 shows a schematic cross-sectional representation of a portion of an electrical connection device according to a specific embodiment of the invention.
Figure 2:
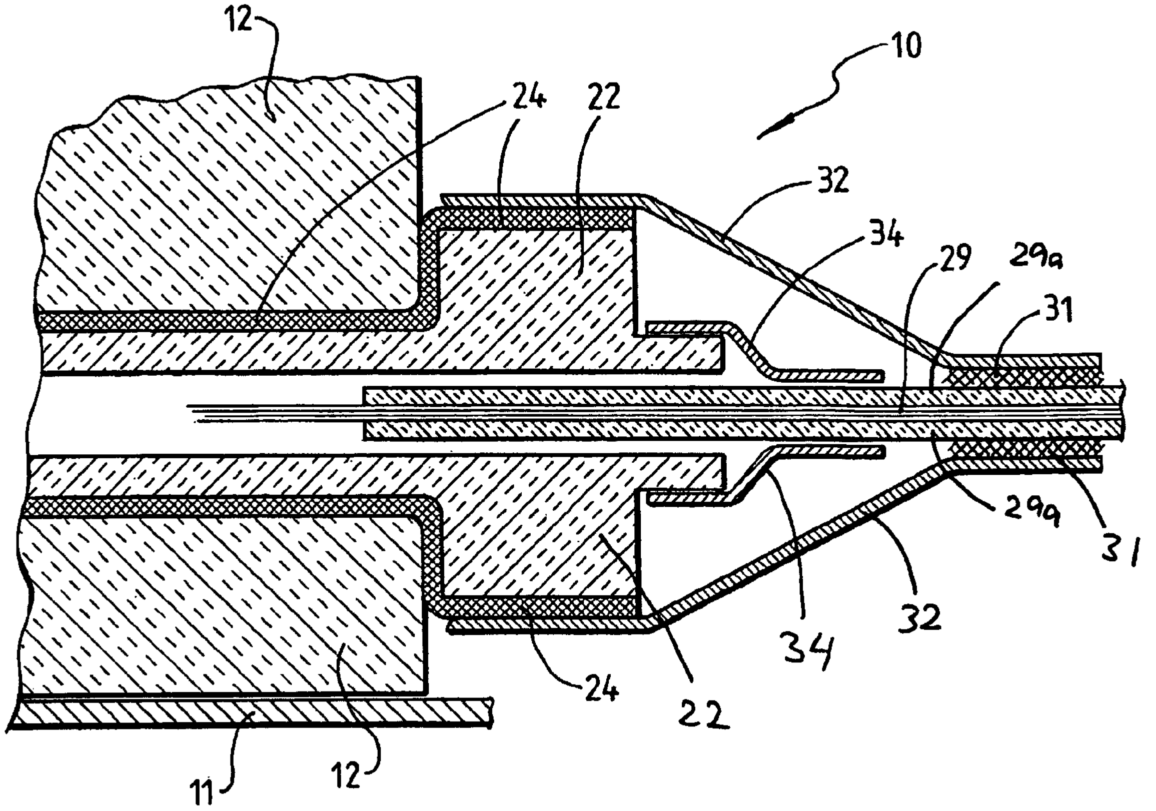
FIG. 2 shows a schematic cross-sectional representation of a portion of an electrical connection device according to another specific embodiment of the invention.
Figure 3:
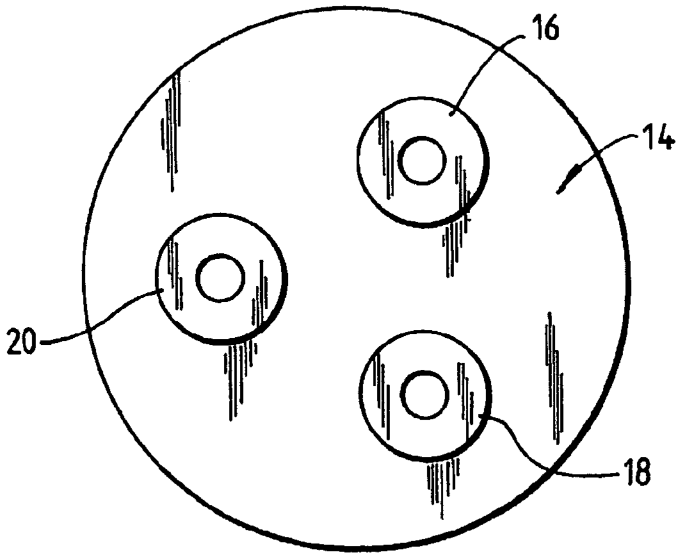
FIG. 3 shows a view of an end-face of the electrical connection device shown in FIG. 1 or 2.

Referring to FIGS. 1 to 3, the electrical connection device 10 is now described. FIG. 2 shows a variation of the device that is in part shown in FIG. 1. For clarity, however, the same reference numerals have been used in FIGS. 1-4 for parts that have the same function.

In this embodiment components of the electrical connection device 10 are sized and structured so that the electrical connection device is suitable for delivery of a few hundred kW to a few MW of power.

The device 10 comprises a body 12 that is composed of an insulating material such as a polymeric material. The body 12 is of substantially cylindrical shape and is surrounded by an outer shell 11 composed of a metallic material. Alternatively, the outer shell 11 may be composed of an insulating material such as a polymeric material. The body 12 and the outer shell 11 are typically fabricated so that they form one joined part. If the outer shell is composed of an insulating material, the body 12 and the outer shell 11 may also be integrally formed.

FIGS. 1 and 2 show representative portions of the device 10. The body 12 has an end-face 14 that has three apertures (see FIG. 3) at which nuts 16, 18 and 20 are positioned. From each aperture an insulating sleeve 22 projects inwardly. Each insulating sleeve 22 has a threaded end-portion 23 that is arranged to receive respective nuts 16, 18 or 20. Each insulating sleeve 22 is surrounded by a conductive layer 24 and locates a pin 26. The pin 26 is connected to a thimble 28 which is connected to an individual core 29 of a multi-core machine cable (the multi-core machine cable is not shown).

In this embodiment the multi-core machine cable is a 3-phase cable having three multi-strand cores. Each core is insulated and has an earth-potential layer 31 individually surrounding its insulation 29*a*.

The earth-potential layer 31 is in contact with cold-shrink tube 32. The cold-shrink tube 32 surrounds a portion of the earth layer 31 and also a portion of the conductive layer 24 of the insulating sleeve 22. In general cold-shrink tubes are used to provide electrical insulation and the inhibit penetration of moisture. The cold-shrink tube 32 also has a conductive layer on its interior surface which establishes an electrical connection between the earth-potential layer 31 and the conductive layer 24. The cold-shrink tube 32 is in part surrounded by a further cold-shrink glove 33 which is arranged to reduce the likelihood that moisture from the machine cable may penetrate into the electrical device 10. Cold-shrink tube 34 in part surrounds an end portion of sleeve 22 and is arranged to reduce the likelihood that moisture penetrates from the insulating sleeve 22 along core 29 into the machine cable and vice versa. Further, cold shrink tube 34 provides additional insulation between parts that are electrically connected to the core 29 and parts that are on earth potential such as the conductive layer of tube 32.

Thimble 28 is connected to a core 29 of the multi-core cable and the respective earth potential layer 31 is connected to the conductive layer 24. Therefore, the core 29 and any conductive portions that may be in electrical contact with the core are, is within the body 12 individually surrounded either by the conductive layer 24 or the respective earth potential layer 31 of the multi-core cable. The conductive layer 24 is connected to the nut 16 which is, in this example, metallic.

In this embodiment the end-face 14 of the external shell 11 is composed of an insulating material. Therefore, for each core of the machine cable an individual earth connection is established within the electrical connection device 10 and can be individually continued to another electrical device (not shown) via the faces of nuts 16, 18 and 20.

In a variation of this embodiment, the end-face 14 may also be composed of a conductive material. In this case the end-portion 14 and the nuts 16, 18 and 20 have, in use, a common earth potential.

The electrical connection device 10 may be connected to the machine cable as follows. Initially a core 29 of the machine cable is connected to thimble 28. Thimble 28 and pin 26 are then inserted into sleeve 22 from opposing ends and are connected in sleeve 22 at an internal shoulder 39 so that the pin 26 and the thimble 28 are firmly mechanically connected with the sleeve 22. Cold-shrink tube 34 is then applied over an end-portion of sleeve 22 and over the insulation 29*a* of core 29. Cold-shrink tube 32 is applied over the earth-potential layer 31 of the core 29 and over the external shoulder of sleeve 22 so as to provide an electrical connection between the external conductive layer 24 of the sleeve 22 and the earth potential layer 31. Cold-shrink glove 33 is then applied over cold-shrink tube 32 and over the outer sheath of the multi-core cable (the multi-core cable is not shown). Sleeve 22 is inserted into an aperture of body 12 so that an external shoulder of sleeve 22 abuts against an end-face of body 12. Nut 16 is then inserted into the aperture from an opposing end-face 14 of body 12. After nut 16 is secured with sleeve 22, a mechanical connection between sleeve 22 and body 12 is established.

Figure 4:
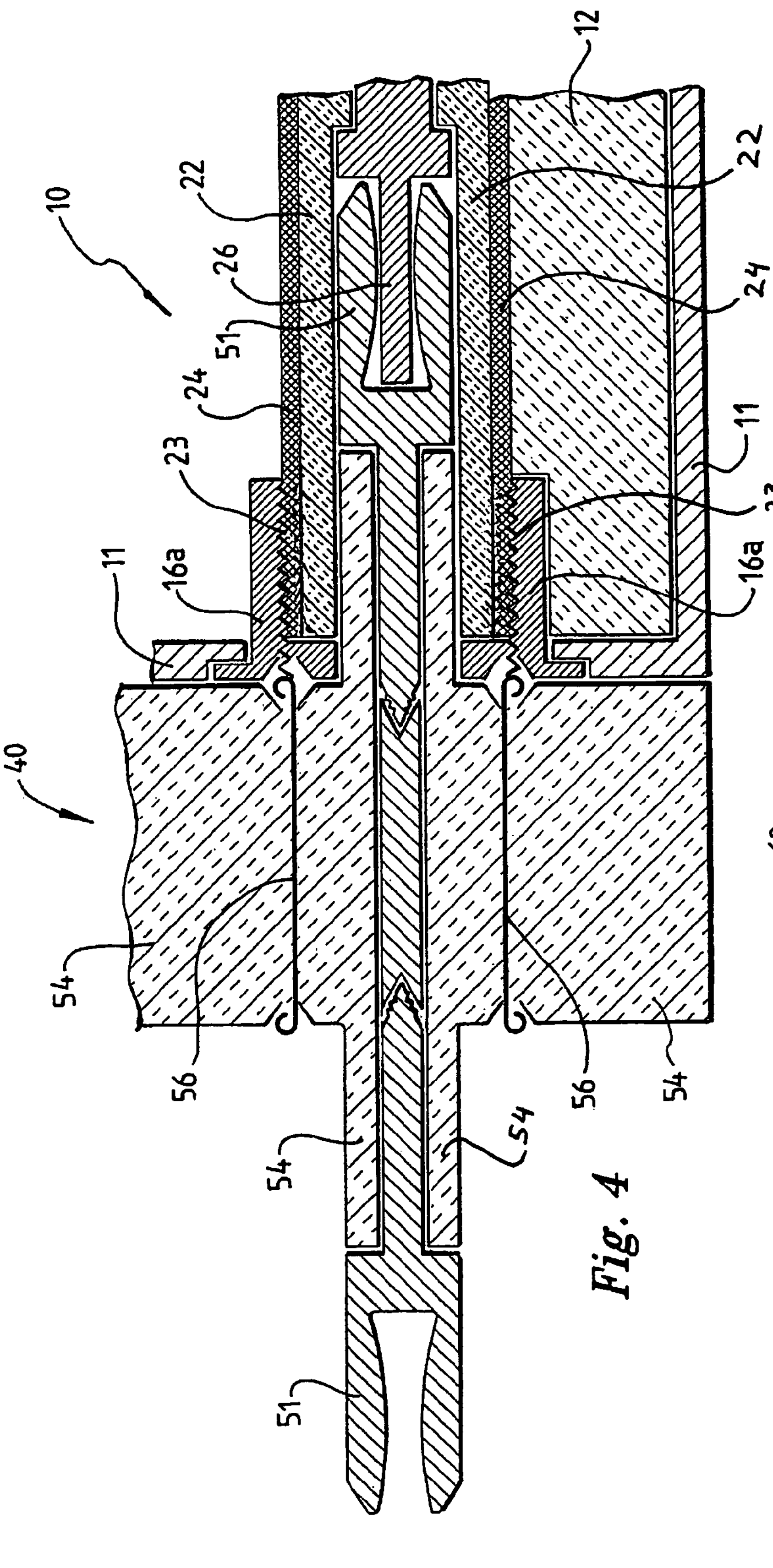
FIG. 4 shows a schematic cross-sectional representation of a portion of an electrical connection device according to another specific embodiment of the invention and FIG. 5 shows a schematic cross-sectional representation of a portion of an electrical connection device according to a further specific embodiment of the invention.

FIG. 4 shows a portion of the electrical connection device 10 connected to another electrical connection device 40. In this example the nut 16 is replaced by nut 16*a* which is composed mainly of an insulating material but has a metallic layer on its thread that is in contact with conductive layer 24 of sleeve 22. The other electrical connection device 40 comprises two sockets 51 which are electrically connected in an insulating body 54. The other electrical connection device 40 and the electrical connection device 10 are arranged so that one of the sockets 51, when connected to pin 26, is positioned within the insulating sleeve 22. Individual earth connections are established via conductive sleeve 56 which is positioned at least in part within insulating body 54. Thus, the individual earth layer 31 of the respective core of the machine cable (not shown) is connected via the conductive layer of the cold-shrink tube 32 (see FIG. 1), the conductive layer 24 of the insulating sleeve 22 and the conductive thread of nut 16*a* with conductive layer 56. In this embodiment individual earth connections can be established even if the face 14 of the external shell is electrically conductive as the nuts 16*a* are composed of an insulating material and only have an inner conductive layer. The other electrical connection device 40 may receive a further electrical connection device of the same type as electrical connection device 10 and the assembly of the devices therefore would provide an electrical connection between two multi-core machine cables in which individual earth potential layers are continued individually.

Figure 5:
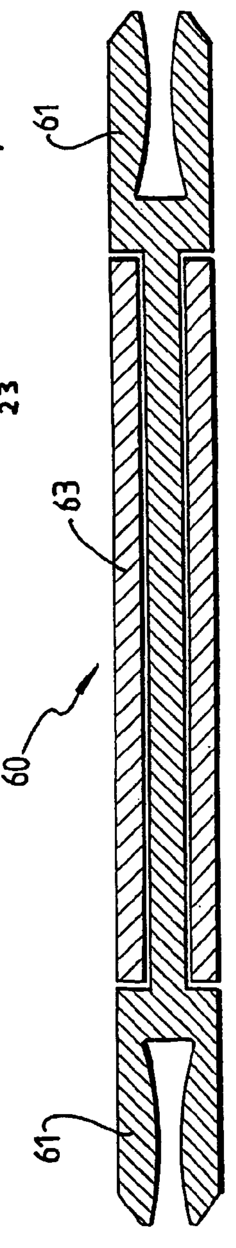

FIG. 5 shows another embodiment of the present invention. The Figure shows a coupling device 60 that comprises two electrically connected sockets 61 and an insulating sleeve 63. Three of the devices 60 may be used to electrically connect two devices 10 shown in FIGS. 1-3. Each of the devices 60 is, in this case, arranged to fit into respective apertures defined by nuts 16, 18 and 20. If two devices 10 of the type shown in FIGS. 1-3 are connected using three devices 60 and the two devices 10 have electrically insulating faces 14 of the outer shells 11, continuous and individual earth connections may be established by face-to-face connection of the nuts 16,18 and 20 of the respective devices 10.

Although the invention has been described with reference to particular examples, it will be appreciated by those skilled in the art that the invention may be embodied in many other forms. For example, the pin 26 may only partially be positioned within the insulating sleeve 22 and it may extend through the aperture of the nut 16. Also, the insulating sleeve 22 may have a socket 51 positioned within its interior instead of the pin 26. Optionally, one sleeve may have a pin and another sleeve may have a socket positioned within its interior. The electrical connection device 10 may be arranged for connection to any type of connection device including a lug or any other electrical device. Further, the electrical connection device may have a common earth potential layer that surrounds all of the individual earth potential layers. It will also be appreciated that cold shrink tubes 32 and 34 and cold shrink glove 33 may be replaced by suitable heat-shrink products or suitable adhesive tape.

The invention claimed is:

1. An electrical connection device for connecting a multi-core machine cable to a suitable other electrical device, the multi-core machine cable being of the type having insulated cores individually surrounded by earth-potential layers, the device comprising:

an insulating body;

a plurality of insulating sleeves extending into the body;

a plurality of core coupling means each being at least in part positioned in a respective insulating sleeve, each core coupling means being connectable to a respective core of the machine cable and having a first contact surface for connecting to a terminal of the suitable other electrical device so as to provide electrical connections of the machine cable with the suitable other electrical device; and a plurality of spaced apart earth coupling means surrounding at least a portion of respective insulating sleeves, each earth coupling means being connectable to a respective earth-potential layer of the machine cable and having a second contact surface for connecting to an earth potential terminal of the suitable other electrical device, wherein the core coupling means are earth-potential screened from one another and said earth coupling means are, within said body, electrically isolated from each other, so that a continuation of individual earth-connections to the suitable other electrical connection device is possible.

2. The electrical connection device as claimed in claim 1 wherein each core coupling means is surrounded by a respective insulating sleeve which is surrounded along its length by a respective earth-potential coupling means which typically comprises a conductive layer.

3. The electrical connection device as claimed in claim 1 arranged such that, within the body, each core and the respective core coupling means are, in use, surrounded by a respective conductive layer or by the earth potential layer of the respective core.

4. The electrical connection device as claimed in claim 1 wherein each insulating sleeve is surrounded along its length by a respective conductive layer.

5. The electrical connection device as claimed in claim 1 wherein the core coupling means comprises a pin.

6. The electrical connection device as claimed in claim 1 wherein the core coupling means comprises a socket.

7. The electrical connection device as claimed in claim 1 having ring-like contacts which comprise the second contact surfaces, each ring-like contact being positioned at a respective one of the apertures and electrically contactable with respective ones of individual conductive layers which the earth coupling means comprises.

8. The electrical connection device as claimed in claim 7 wherein the insulating sleeves are provided in form of tubes having a thread at one end and wherein the ring-like contacts are provided in form of nuts that are receivable by the threads of the insulating tubes.

9. The electrical connection device as claimed claim 1 having ring-like contacts which comprise the second contact surface, each ring-like contact being positioned within a respective one of the apertures and electrically contactable with respective ones of the individual conductive layers.

10. The electrical connection device as claimed in claim 9 wherein the insulating sleeves are provided in form of tubes having a thread at one end and wherein the ring-like contacts are provided in form of nuts that are receivable by the threads of the insulating tubes.

11. The electrical connection device as claimed in claim 10 wherein, in use, each conductive layer is in electrical contact with a respective nut.

12. The electrical connection device as claimed in claim 11 wherein each nut has an electrical conductive surface on its thread.

13. The electrical connection device as claimed in claim 12 wherein each nut is composed of an electrically conductive material.

14. The electrical connection device as claimed in claim 1 wherein the insulating sleeves are provided in form of tubes.

15. The electrical connection device as claimed in claim 14 wherein each tube has a thread at one end.

16. The electrical connection device as claimed in claim 1 arranged such that, when the electrical connection device is connected to the suitable other electrical device, a coupling means of the suitable other electrical device is positioned at least in part within a respective one of the insulating sleeves of the electrical connection device.

17. The electrical connection device as claimed in claim 1 wherein the multi-core machine cable is a three-core machine cable and the electrical connection device comprises three apertures and three insulating tubes associated with the apertures.

18. The electrical connection device as claimed in claim 1 wherein the device comprises an exterior surface portion that is metallic.

19. The electrical connection device as claimed in claim 1 wherein the device comprises an exterior surface portion that is electrically insulating.

20. The electrical connection device as claimed in claims 19 wherein the body is composed of a polymeric material.

21. The electrical connection device as claimed in claim 1 wherein each insulating sleeve is surrounded by a plurality of conductive layer which are electrically isolated so that, in use, a plurality of separate earth potential screens is established.

22. The electrical connection device as claimed in claim 1 being suitable for delivery of more than 100 kW of power.

23. The electrical connection device as claimed in claim 1 being suitable for delivery of more than 1 MW of power.

24. A system comprising:

at least one electrical connection devices as claimed in claim 1 at least one multi-core machine cable being of the type having insulated cores individually surrounded by earth-potential layers; and at least one electrical machine, wherein the system is arranged so that electricity is delivered through the or each machine cable and through the or each electrical connection device and wherein the electricity associated with each core is individually earth-potential screened in the multi-core cable and in the or each electrical connection device.

25. An electrical connection device for connection to a suitable other electrical device the device comprising:

a multi-core machine cable of the type having insulated cores individually surrounded by earth-potential layers;

an insulating body;

a plurality of insulating sleeves extending into the body; a plurality of core coupling means each being at least in part positioned in a respective insulating sleeve, each core coupling means being connected to a respective core of the machine cable and having a first contact surface for connecting to a terminal of the suitable other electrical device so as to provide electrical connections of the machine cable with the suitable other electrical device; and a plurality of spaced apart earth coupling means surrounding respective insulating sleeves, each earth coupling means being connected to a respective earth-potential layer of the machine cable such that, within the body, each core and the respective core coupling means are surrounded by a respective conductive layer or by the earth potential layer of the respective core, the earth coupling means having a second contact surface for connecting to an earth potential terminal of the suitable other electrical device, wherein the core coupling means are earth-potential screened from one another and said earth coupling means are, within said body, electrically isolated from each other, so that a continuation of individual earth-connections to the suitable other electrical connection device is possible.

* * * * *